United States Patent [19]

Layden

[11] 4,412,854
[45] Nov. 1, 1983

[54] METHOD OF PRODUCING FIBER REINFORCED GLASS MATRIX COMPOSITE ARTICLES OF COMPLEX SHAPE

[75] Inventor: George K. Layden, Wethersfield, Conn.

[73] Assignee: United Technologies Corporation, Hartford, Conn.

[21] Appl. No.: 381,803

[22] Filed: May 25, 1982

[51] Int. Cl.³ .................. B32B 5/00; C03C 27/00; C03B 23/20

[52] U.S. Cl. ........................... 65/18.1; 65/4.21; 65/36; 65/43; 264/109; 264/113; 264/125; 428/114; 428/367; 428/902; 501/89; 501/95

[58] Field of Search ............... 501/89, 95; 65/3.2, 65/4.21, 18.1, 18.4, 36, 43; 264/109, 111, 112, 125, 113; 428/902, 114, 367, 697

[56] References Cited

U.S. PATENT DOCUMENTS

| | | | |
|---|---|---|---|
| 4,110,505 | 8/1978 | Prewo | 428/114 |
| 4,260,441 | 4/1981 | Prewo | 428/902 X |
| 4,265,968 | 5/1981 | Prewo | 428/367 X |
| 4,324,843 | 4/1982 | Brennan et al. | 428/697 |
| 4,357,286 | 11/1982 | Stalcup et al. | 65/18.1 X |
| 4,368,234 | 1/1983 | Palmer et al. | 428/902 |

Primary Examiner—Robert L. Lindsay, Jr.
Attorney, Agent, or Firm—Harry J. Gwinnell

[57] ABSTRACT

A method of making fiber reinforced glass composite articles of complex shape is disclosed which overcomes problems associated with the debulking process common with such procedures. Sheets of woven or nonwoven fiber reinforcement are impregnated with a layer of thermoplastic binder containing glass powder and optionally, additional carrier liquid. The thus treated sheets are then dried and cut into a plurality of preforms corresponding to the predetermined pattern of the article being fabricated. The thus treated preforms are then stacked in a mold and warm molded to form an intermediate article of near net shape, during which molding operation much of the ultimate debulking occurs. The intermediate article is then hot pressed to form the final fiber reinforced glass matrix article of net shape and high strength and toughness. These multiple heating steps may also be accomplished in a single molding operation.

3 Claims, 4 Drawing Figures

METHOD OF PRODUCING FIBER REINFORCED GLASS MATRIX COMPOSITE ARTICLES OF COMPLEX SHAPE

The Government has rights in this invention pursuant to Contract No. N00014-81-C-0218 awarded by the Department of the Navy.

DESCRIPTION

Technical Field

The field of art to which this invention pertains is molding processes, and particularly molding processes for fiber reinforced composite articles.

Background Art

Because of the scarcity and increasing expense of many conventional high temperature structural metals, increased attention has focused on non-metal fiber reinforced composites as replacements for conventional high temperature metal alloys. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature.

Ceramic, glass and glass-ceramic bodies are known to the art which can be employed in high temperature applications. Unfortunately, however, these bodies frequently lack the mechanical strength desired and are invariably deficient in toughness and impact resistance. This situation has given rise to the preparation of composite bodies consisting of a matrix of ceramic, glass, or glass-ceramic material with inorganic fibers dispersed in continuous or discontinuous fashion therein. Henceforth referred to as glass matrix composites, these materials are described in U.S. Pat. Nos. 4,314,852 and 4,324,843. Glass-ceramic matrix-silicon carbide fiber composite components prepared according to the teachings of the above-referenced patents exhibit physical properties which permit their utilization in heat engines and other applications to effect significant improvement in performance. Such applications, however, require that novel methods of fabrication be found for the production of complex shaped parts with reinforcing fibers distributed, for example, in at least three directions to impart improved strength.

Even though great strides have been made in this area, difficulties exist in methods of preparing such improved composite articles. In the past, continuous fiber reinforcement for composite articles has been achieved through the use of collimated fiber tapes, felts and papers which are infiltrated with glass-carrier slurries, cut to size, and oriented and then stacked in a die for hot pressing. However, this procedure is inadequate for more complex shapes in that it achieves only a planar array of fibers. It is also difficult to form cylinders and other complex shapes with such materials. This is so because collimated fiber tapes cannot be deformed into topographically complex shapes without severe disorientation of fibers. This results in non-uniform fiber distribution, for instance, having fiber-deficient areas representing regions of weakness in the composite.

In current resin matrix composite technology this shortcoming is overcome through the use of preimpregnated ("prepreg") woven fabrics. Such prepreg sheets can be cut and tailored into the most suitable patterns for achieving the desired fiber reinforcement of the resin matrix. Suitable layups of the prepreg patterns are then consolidated and cured under modest temperature and pressure.

As stated, in the past, the techniques available for forming glass matrix composites have limited articles to shapes that can be uniaxially hot pressed from essentially planar arrays of reinforcing fibers such as can be produced from aligned fiber tapes, woven fabrics, felts or papers. Note the U.S. patents cited above. In the process of consolidating such fiber tapes, papers, etc. which have been infiltrated with a slurry containing a glass frit, a large degree of debulking must take place. The debulking which takes place when a slurry treated fibrous mat is consolidated, for example, can vary from 1000–3000% for a felt or low density fiber mat. This kind of debulking can be tolerated when forming relatively thin plates of materials, but presents a formidable problem when complex three-dimensional shapes are required which preserve desirable fiber orientation.

Accordingly what is needed in this art is a method of forming fiber reinforced glass matrix composites of complex shape which overcomes the problems described above.

DISCLOSURE OF INVENTION

The present invention is directed to a method of making fiber reinforced glass composite articles, particularly adapted to making such articles of complex shape which, among other things, overcomes a large debulking problem typically encountered when making such articles. According to the present invention, woven or non-woven sheets of fiber reinforcement are preimpregnated with a carrier liquid containing a thermoplastic polymeric binder and glass powder. These sheets are then cut into a particular design pattern of the complex composite part to be made. Generally this entails utilizing a plurality of such sheets. The thus formed preimpregnated sheets are then contoured and stacked as required in a mold and consolidated into a composite preform at moderate temperature and pressure. The greatest degree of the debulking of the composite takes place at this stage, thus allowing smaller hot presses to be used in the final consolidation step. Another advantage of forming the composite preform at this stage is that the preform may be inspected for precision in layup and composite design before the final hot pressing. This composite preform is then hot pressed to form the final glass matrix composite shape. The hot pressing may optionally include a preliminary heat treatment to burn off or otherwise remove the temporary thermoplastic binder.

The foregoing and other features and advantages of the present invention will become more apparent from the following description and accompanying drawings.

Figure 1:
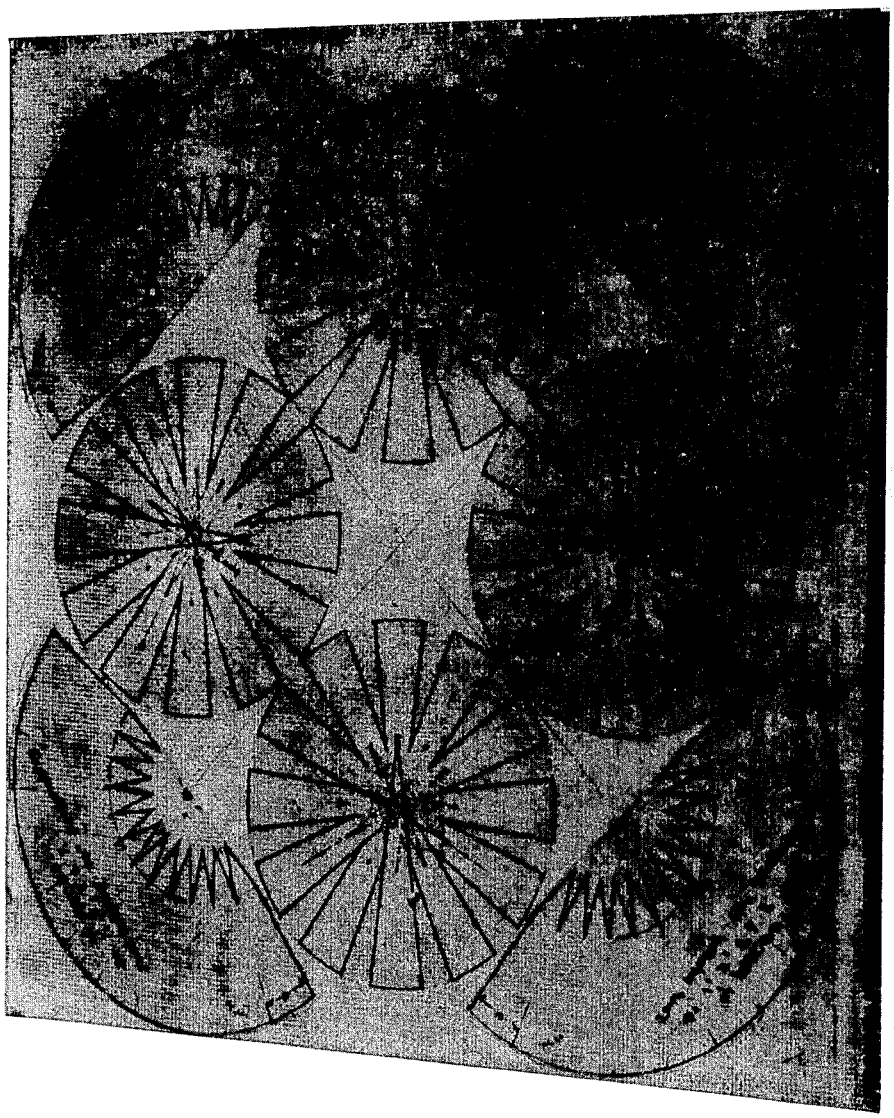
FIG. 1 shows typical patterns on preimpregnated woven fiber reinforcement prior to cutting.
Figure 2:
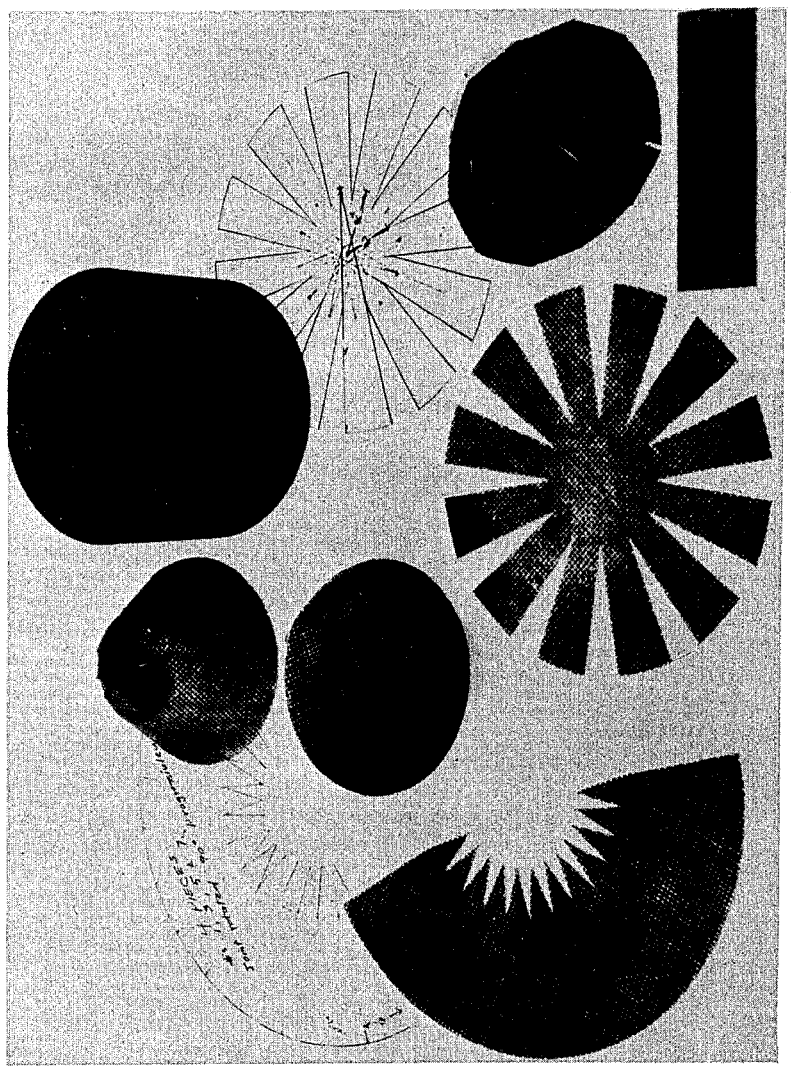
FIG. 2 shows such patterns after cutting and assembly.

Best Mode for Carrying Out the Invention

While any glass which will impart high temperature strength properties to composites according to the present invention can be used with the present invention, Corning 1723 (Corning Glass Works) aluminosilicate glass was found well-suited for this process. Similarly, Corning 7740 borosilicate glass and Corning 7930 high silicon content glass (about 96% by weight silica) obtained by leaching the boron from a borosilicate glass are preferred borosilicate and high silica content glasses, respectively. While the borosilicate glass and the aluminosilicate glass can be used in its as received −325 mesh size form, the desired properties for the high silica content glass composites have only been satisfactorily fabricated with the glass after it has been ball milled in propanol for more than 100 hours. It should also be noted that mixtures of the above glasses may also be used.

Another attractive matrix material for the process of the present invention is a glass-ceramic. During composite densification the matrix is retained in the glassy state, thus avoiding fiber damage and promoting densification under low applied pressure. After densification to the desired fiber plux matrix configuration, the glassy matrix can be converted to the crystalline state, the degree and extent of crystallization being controlled by the matrix composition and heat treatment schedule employed. A wide variety of glass-ceramics can be used in this manner, however, when using silicon carbide fibers a strict limitation on the amount and activity of titanium present in the glass is of controlling importance. Accordingly, if silicon carbide fibers and titania nucleating agents are used, the titania must be inactivated or kept below 1% by weight. This can be accomplished by simply substituting another nucleating agent such as zirconia for the conventional titania or adding an agent to mask the reactivity of the titania toward the silicon carbide fiber. However, in any case it is necessary to either eliminate or mask the effects of the titania on the silicon carbide fiber to attain a composite with good high temperature strength properties. And while conventional lithium aluminosilicate is the preferred glass-ceramic, other conventional glass-ceramics such as aluminosilicate, magnesium aluminosilicate, and combinations of the above can be used as long as the ceramic matrix material is titanium free (less than about 1% by weight) or masked. Note commonly assigned U.S. Pat. No. 4,324,843, the disclosure of which is incorporated by reference.

In general the starting glass-ceramic material can be obtained in the glassy state in powder form. If, however, the ceramic material is obtained in crystalline form, it will be necessary to melt the material to form it into the glassy state, solidify it and subsequently crush it into powder form, preferably about −325 mesh, prior to making up the slurries according to the present invention. It is important in selecting a glass-ceramic material that one be selected which can be densified in the glassy state with the viscosity low enough to permit complete densification with subsequent transformation into a substantially completely crystalline state. It is also possible, however, to convert the starting crystalline powder to the glassy state during preheat treatment prior to application of pressure for densification.

While any high temperature stable fiber material can be used in the method according to the present invention, such as graphite, alumina, or silicon nitride, silicon carbide fibers are especially preferred. A multifilament silicon carbide yarn with an average filament diameter up to 50 microns, for example 5 to 50 microns, is especially preferred. Nippon Carbon Company of Japan produces such a yarn with about 250 fibers per tow and an average fiber diameter of about 10 microns. The average strength of the fiber is approximately 2000 MPa and it has a use temperature of up to 1200° C. The yarn has a density of approximately 2.6 grams per cubic centimeter and an elastic modulus of approximately 221 GPa.

These fibers can also be used in non-woven form such as Celion ® 6000 graphite fibers available in planar orientation from International Paper Co. or silicon carbide chopped to paper length (e.g. about 1 to about 3 cm) and formed into sheets by conventional papermaking techniques.

Any thermoplastic polymeric binder which dissolves or disperses readily in the particular carrier material selected can be used with the present invention. Rhoplex ® (Rohm and Haas Corporation) acrylic polymers have been found to be particularly suitable binder materials for the process of the present invention. Accordingly, any carrier material compatible with such binders can also be used, with water being preferred.

While the amounts of the materials may vary, the slurry is generally prepared so that the mixture of glass powder, binder, and carrier liquid have a consistency that can be easily applied to the fibers, e.g. with a brush. Typically the amount of glass added will be such as to give about 50 to 80% by volume concentration on the fibers where carrier liquid and binder have been removed. The amount of carrier liquid and binder will vary depending upon the form and density of the fibrous material, but the binder will typically vary from about 0.5 ml to 1 ml per gram of −325 glass frit, and additional carrier liquid will typically vary from 0 to about 2 ml per gram of glass frit in cases where the fibrous material is a tightly woven cloth, and up to about 10 ml of carrier liquid per gram of −325 glass frit when the fibrous material is a low density non-woven material such as paper.

EXAMPLE 1

Figure 3:
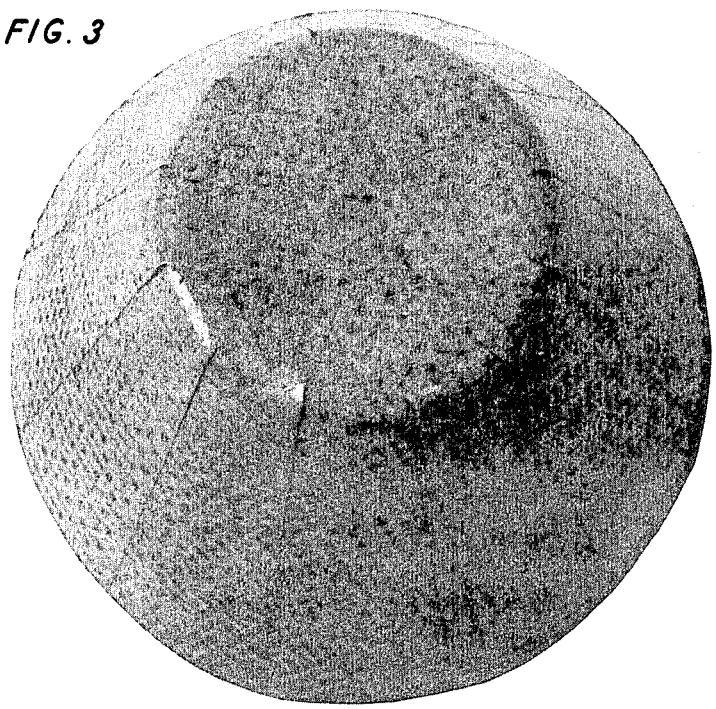
FIG. 3 shows the warm molded article prior to binder burnoff and hot pressing.
Figure 3:
Figure 4:
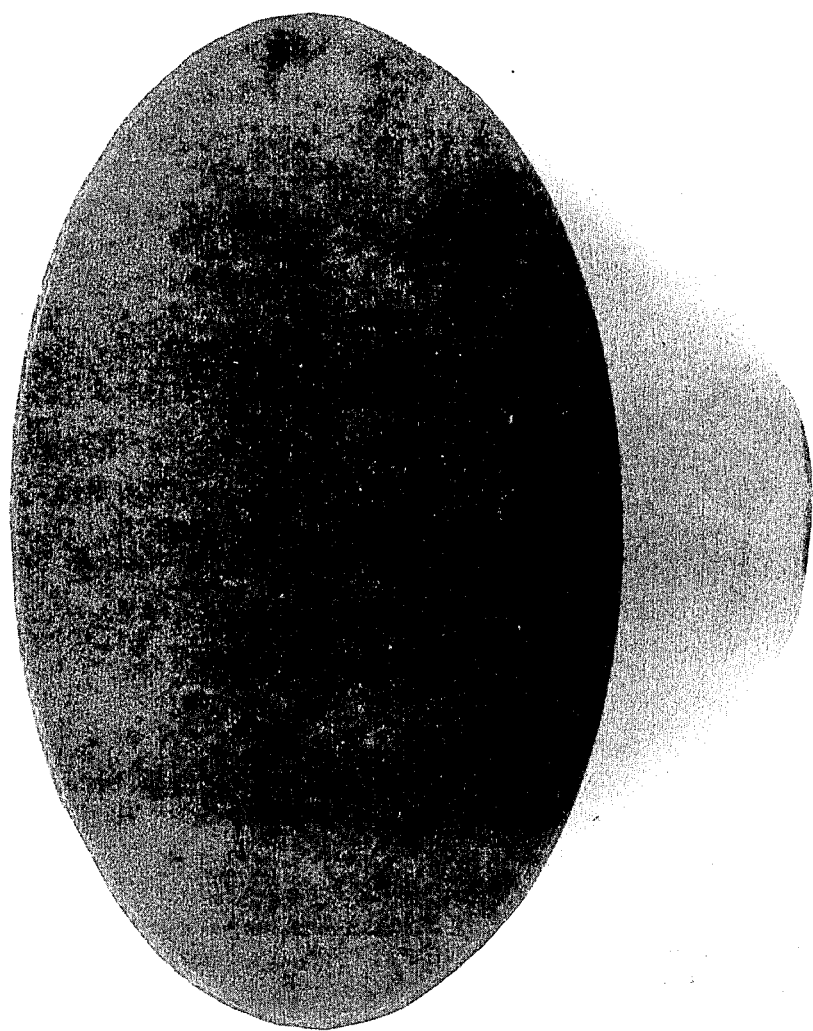
FIG. 4 shows the final article.

A graphite fiber reinforced glass frustum of a cone was made as follows. Four Thermo-fax ® (Minnesota Mining and Manufacturing Co.) transparencies (each of two alternating patterns used to form the composite) were made and a layout chosen which permitted least waste of material. Note FIG. 1. A piece of plain woven (Union Carbide Co. "Thornel 300") carbon cloth having a weight of six ounces per square yard was cut to dimensions 18 in. × 18 in. The thus cut cloth had a weight of 43.5 grams. A "paint" was prepared with 87 grams of −325 mesh Corning Glass Works 7740 borosilicate glass and 65.25 milliliters of Rhoplex binder. The carbon cloth was placed on a sheet of Mylar ® film on a flat surface, and about two-thirds of the volume of the paint was applied to the top surface of the cloth. The cloth was then turned over and the remainder of the paint applied to the other side. The thus preimpregnated carbon cloth was allowed to dry overnight then stripped from the Mylar backing. This preimpregnated sheet was found to be tough, flexible and non-shedding. The sheet at this stage consisted of 33.3 weight percent fiber and 66.7 weight percent glass, permanent solids (after binder and carrier liquid removed). This is equivalent to a forty volume percent fiber composite. The Thermofax transparencies were then pasted onto the prepreg cloth using Rhoplex as the adhesive as shown in FIG. 1. The individual patterns were then cut from the prepreg cloth and the transparencies stripped off. The pieces were placed in an oven at 150° C. to soften the binder to render the sheets hand-moldable and then formed by hand over the male plug of the mold and held temporarily using a piece of plastic tape. After stripping the tape, the thus molded individual pieces were assembled in the mold in alternating sequence and the plurality of layers warm molded at 150° C. to form the rigid precursor frustum as shown in FIG. 3. The graphite mold was then disassembled, sprayed with boron nitride, and fitted with molybdenum separators to prevent sticking of the composite to the mold. The precursor frustum cone was returned to the mold which was placed in a retort and heated under flowing argon to 600° C. to decompose the temporary binder. The mold was then placed in a hot press for final consolidation of the part. The finished part is shown in FIG. 4. Although the heating has been described as a multiple step process, it can also be performed in the mold as a single operation following a heating schedule similar to the multistep process described above.

EXAMPLE 2

A similar procedure was performed as in Example 1 using non-woven Thornel 300 carbon paper having a weight of three ounces per yard. The carbon paper was cut to the approximate shape of the patterns shown in FIG. 1. These were placed on Mylar sheets and impregnated with a slurry containing 0.5 ml of Rhoplex binder and 4.5 ml of water per gram of glass frit. These were taped to a rotating mandrel and dried under a heat lamp. Rotation during drying was found essential to maintain a uniform distribution of frit throughout the paper. Precise patterns were cut from the paper prepregs and the procedure of Example 1 was followed to produce the resin bonded preform and final hot pressed frustum.

In addition to providing a relatively simple method for forming composite articles of such complex shapes, this method is readily adaptable to mass production.

Typical complex shapes which may be made by the process of the present invention are jet engine burner can segments, hollow containers, such as cups, etc. The articles of the present invention based on the compositions of the components (e.g. silicon carbide fibers and glass-ceramic matrices) also have particular utility as high temperature structural glass components in environments where oxidation resistance, high strength, and toughness are required, for example as gas turbine engine or internal combustion engine components. In this regard note also U.S. Pat. No. 4,324,843, the disclosure of which is incorporated by reference.

Although the invention has been shown and described with respect to detailed embodiments thereof, it should be understood by those skilled in this art that various changes and omissions in form and detail may be made therein without departing from the spirit and scope of the invention.

I claim:

1. A method of making fiber reinforced glass composite articles that is particularly adapted to making such articles in complex shapes, comprising applying a layer of carrier liquid containing glass powder and a thermoplastic polymeric binder to a sheet of woven or nonwoven high temperature stable fiber reinforcement, cutting a plurality of preforms of predetermined patterns from such sheets, stacking a plurality of the treated preforms on top of each other on a mold surface, warm molding the stacked preforms to form an intermediate article of definite predetermined shape, heating the formed article to decompose and remove the fugitive binder, hot pressing the thus treated article to form a composite article of high strength.

2. The method of claim 1 wherein the glass powder containing layer is applied to the preforms after cutting.

3. The method of claim 1 wherein the polymeric binder is a thermoplastic resin, the carrier liquid is water, the fiber material is graphite, silicon carbide or alumina, and the glass is borosilicate, aluminosilicate, high silica content glass or glass-ceramic.

* * * * *